(12) United States Patent
Hurtz

(10) Patent No.: US 8,084,987 B2
(45) Date of Patent: Dec. 27, 2011

(54) USB PORT WITH SMART POWER MANAGEMENT

(75) Inventor: Gary M. Hurtz, Shanghai (CN)

(73) Assignee: Active-Semi, Inc. (VG)

( * ) Notice: Subject to any disclaimer, the term of this patent is extended or adjusted under 35 U.S.C. 154(b) by 707 days.

(21) Appl. No.: 12/069,955

(22) Filed: Feb. 13, 2008

(65) Prior Publication Data
US 2009/0200982 A1 Aug. 13, 2009

(51) Int. Cl.
*H02J 7/00* (2006.01)
(52) U.S. Cl. ......... 320/103; 323/901; 710/303; 439/668
(58) Field of Classification Search ................... 320/103
See application file for complete search history.

(56) References Cited

U.S. PATENT DOCUMENTS

| 2004/0164708 A1* | 8/2004 | Veselic et al. ................. 320/132 |
| 2005/0144495 A1* | 6/2005 | Nakajima et al. ............. 713/340 |
| 2006/0035527 A1* | 2/2006 | Numano ....................... 439/668 |
| 2008/0129270 A1* | 6/2008 | Kawk et al. ................... 323/288 |

* cited by examiner

*Primary Examiner* — Arun Williams
(74) *Attorney, Agent, or Firm* — Imperium Patent Works; T. Lester Wallace; Darien K. Wallace

(57) ABSTRACT

A method involves detecting an inrush current that flows out of a USB port of a first electronic device when a central processing unit (CPU) of the first electronic device is not being powered. The inrush current is detected by a novel inrush current detect circuit when a second electronic device is connected to the USB port. In one example, the first electronic device is a laptop computer having a battery and a USB DC-to-DC converter. The inrush current detect circuit enables the USB DC-to-DC converter such that the USB DC-to-DC converter receives power from the battery and supplies a regulated voltage to the second electronic device through the USB port while the CPU remains unpowered (not drawing power from the battery).

26 Claims, 7 Drawing Sheets

VOLTAGE SOURCE
EXAMPLE 1

VOLTAGE SOURCE
EXAMPLE 2

USB PORT WITH SMART POWER MANAGEMENT

TECHNICAL FIELD

The disclosed embodiments relate to the field of power management, more specifically, to an always available USB port with smart power management.

BACKGROUND

Mobile communication devices such as Personal Digital Assistants (PDAs) and cellular telephones are typically powered by rechargeable internal batteries. Each different mobile communication device is typically provided along with its own external battery adapter/charger to charge the device's internal batteries. Even for the same type of mobile communication device, a different brand or version of the same type of device often required a different type of adapter/charger. Most of the time, a new version of a device comes with a new version of an external battery adapter/charger because the battery adapters/chargers of the older versions of the device are not compatible with the new version of the device. Therefore, when a new version of a mobile communication device becomes available, previous versions of the device are usually discarded together with their external battery adapters/chargers. This is expensive and harmful to the environment.

The Universal Serial Bus (USB) is a bus that is now supported on many mobile communication devices. Often, the batteries of a mobile communication device can be recharged through the USB port of the device without having to use an external adapter/charger. For example, the batteries of a cellular telephone can be recharged by connecting to the USB port of a desktop computer that is turned on. The batteries of the cellular telephone can also be recharged by connecting to the USB port of a laptop computer that is turned on. The laptop computer is powered by an AC adapter that is in turn plugged into an AC wall socket. Alternatively, if there is no AC wall socket available, then the laptop computer is powered by its internal batteries.

When an external AC power supply is not available, and when the batteries of the mobile communication device are discharged to a low level, it is often desirable to be able to charge the cellular telephone through its USB port from the battery inside a laptop computer. However, it usually takes more than one hour to fully charge the cellular telephone. A powered-on laptop computer consumes a substantial amount of power even if its CPU is sitting in the idle state. Therefore, due to the amount of time it takes to recharge the batteries of the cellular telephone, the CPU of the laptop consumes a large portion of energy available from its battery during the recharge period. This is especially a problem in situations when the cellular telephone needs to be charged right away but the battery of the laptop computer is inadequately charged or the available charge needs to be saved for later use.

SUMMARY

A method comprises detecting an inrush current condition of a first electronic device when a central processing unit (CPU) of the first electronic device is not being powered. The inrush current condition is detected by an inrush current detect circuit of the first electronic device when a second electronic device is connected to a USB port of the first electronic device. In one embodiment, the inrush current condition is detected by applying a regulated voltage onto a terminal of the USB port and determining whether a current flowing out of the USB port is larger than a predetermined current. In another embodiment, the inrush current condition is detected by applying a current source onto a terminal of the USB port and determining whether a voltage on the terminal of the USB port is lower than a predetermined voltage. In one novel aspect, the method further comprises enabling a DC-to-DC converter of the first electronic device such that the DC-to-DC converter supplies a regulated voltage onto the USB port in response to the detection of the inrush current. In another novel aspect, the method further comprises transferring information between the first electronic device and the second electronic device through the USB port in responding to the detection of the inrush current condition.

In one example, the first electronic device is a laptop computer and the second electronic device is a handheld personal digital assistance (PDA) device. The laptop computer includes a CPU, a battery, a USB port, and a USB DC-to-DC converter. The laptop computer is not plugged into any external AC wall socket, and the laptop computer is not turned on. When the handheld PDA device is connected to the USB port of the laptop computer, the inrush current detect circuit of the laptop computer detects an inrush current condition and then enables the USB DC-to-DC converter such that the USB DC-to-DC converter receives energy from the battery and supplies a regulated voltage onto the USB port while the CPU of the laptop computer remains unpowered. In one embodiment, when the USB DC-to-DC converter later on detects that a current flowing out of the USB port is less than a predetermined current, the USB DC-to-DC converter is then automatically disabled. As a result, the large amount of energy stored in the battery of the laptop computer can be used to charge the relatively small battery of the handheld PDA device without requiring the laptop computer to be turned on. Therefore, the method of detecting and charging the handheld PDA device while the laptop computer remains turned off significantly reduces the amount of energy required from the battery of the laptop computer.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
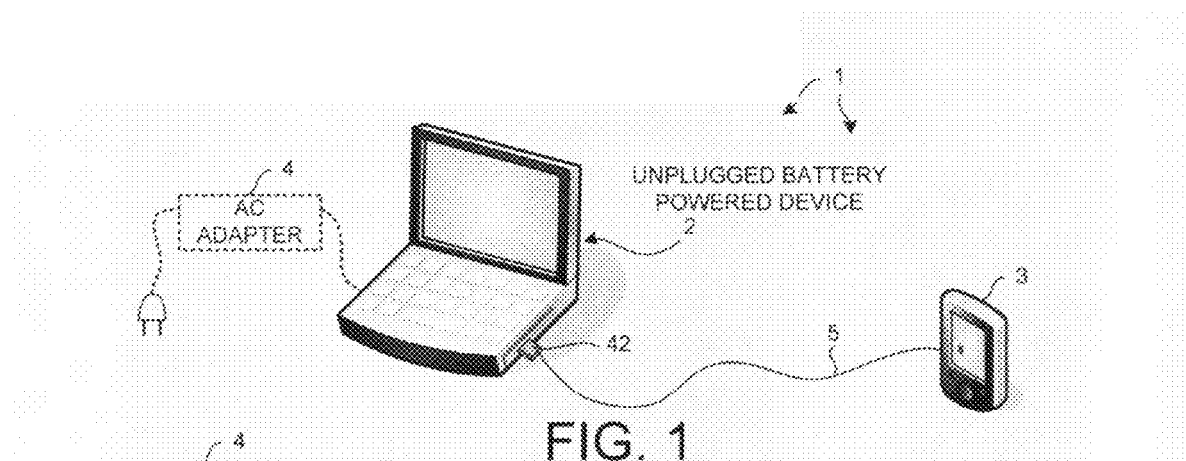
FIG. 1 is a very simplified high level diagram of a system 1 in accordance with one novel aspect.

FIG. 1 is a very simplified high level diagram of a system 1 in accordance with one novel aspect. System 1 includes an unplugged battery-powered device 2, a handheld equipment 3, an AC adapter 4, and a USB cable 5. In the example of FIG. 1, unplugged battery-powered device 2 is a laptop computer that is not plugged into any external AC power through AC adapter 4. Handheld equipment 3 is connected to laptop computer 2 through USB cable 5.

Figure 2:
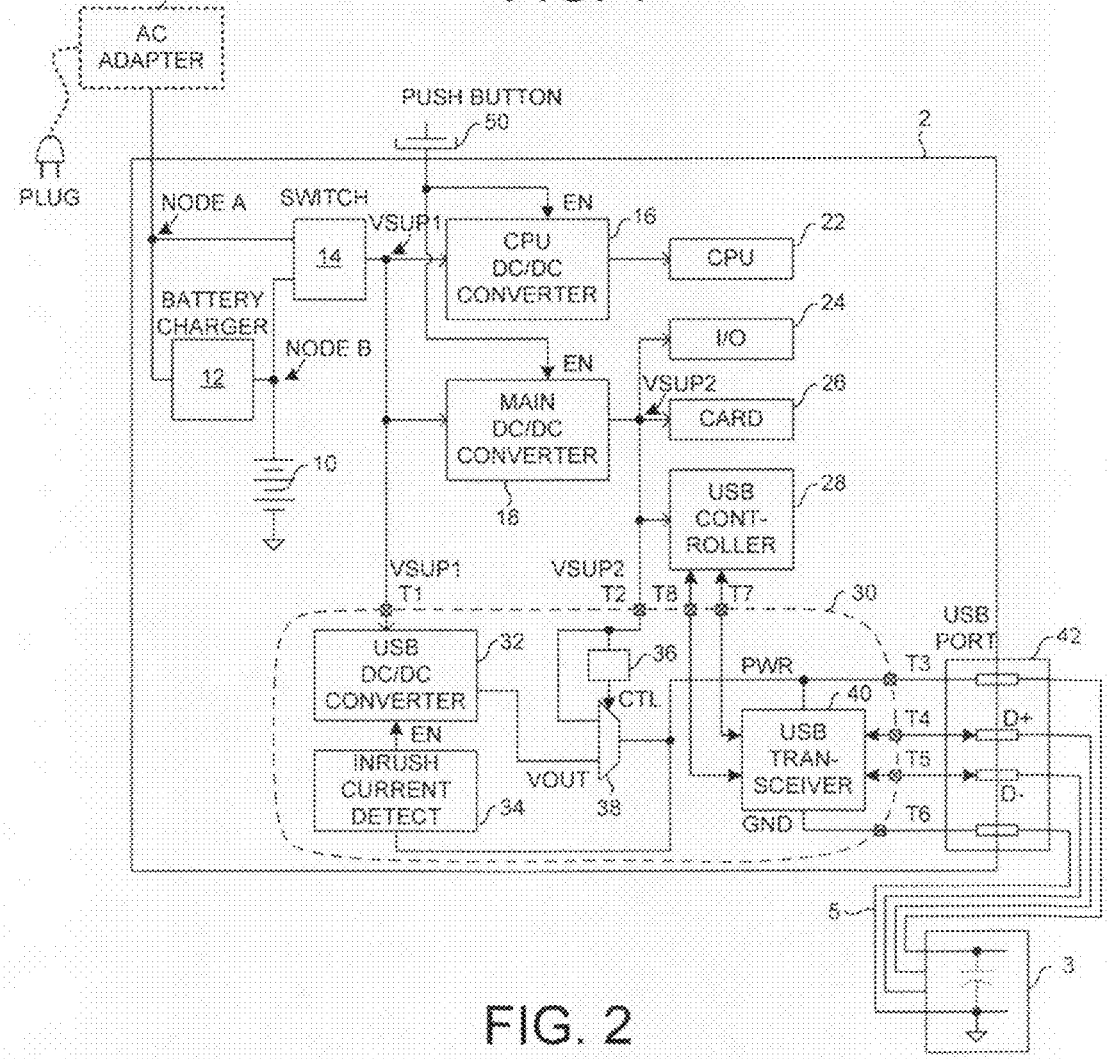
FIG. 2 is a simplified block diagram of a battery-powered device 2 of FIG. 1.

FIG. 2 is a simplified block diagram of a laptop computer 2 of FIG. 1. Laptop computer 2 includes a battery 10, a battery charger 12, a switch 14, a CPU DC-to-DC converter 16, a main DC-to-DC converter 18, a CPU 22, input and/or output (I/O) 24, CARD (for instance, a network interface card) 26, a USB controller 28, an integrated circuit 30, and a physical USB port 42. CPU 22 is powered by CPU DC-to-DC converter 16. I/O 24, CARD 26, and USB controller 28 are powered by main DC-to-DC converter 18. Integrated circuit 30 includes a USB DC-to-DC converter 32, an inrush current detect circuit 34, logic 36, a selection circuit (for instance, a multiplexer) 38, and a USB transceiver 40. Integrated circuit 30 receives DC voltage VSUP1 from terminal T1 and DC voltage VSUP2 from terminal T2. CPU DC-to-DC converter 16, main DC-to-DC converter 18, and USB DC-to-DC converter 32 are all powered by DC voltage VSUP1. If laptop computer 2 is plugged into an external AC power through AC adapter 4, then DC voltage at node A provided by AC adapter 4 is selected by switch 14 to provide DC voltage VSUP1 to power laptop computer 2. At the same time, internal battery 10 is charged by battery charger 12. In this particular example, however, laptop computer 2 is an unplugged battery-powered device because it is not plugged into any external AC wall socket. A DC voltage (for instance, approximately twenty volts) at node B provided by internal battery 10 is therefore selected by switch 14 to provide DC voltage VSUP1 to power laptop computer 2.

As illustrated in FIG. 2, a manual switch (for example, a push button) 50 is included in laptop computer 2 to manually turn on and/or turn off laptop computer 2. If laptop computer 2 is turned on by push button 50, then both CPU DC-to-DC converter 16 and main DC-to-DC converter 18 are enabled. In addition, logic 36 sends a first control signal CTL to multiplexer 38 such that DC voltage VSUP2 of five volts provided by main DC-to-DC converter 18 is selected to power USB transceiver 40 and USB port 42. On the other hand, if laptop computer 2 is turned off, then both CPU DC-to-DC converter 16 and main DC-to-DC converter 18 are disabled. In one novel aspect, USB DC-to-DC converter 32 can be enabled by inrush current detect circuit 34 and can generate a regulated DC voltage VOUT of five volts when handheld equipment 3 is connected to USB port 42. Because main DC-to-DC converter 18 is disabled, logic 36 sends a second control signal CTL to multiplexer 38 such that DC voltage VOUT provided by USB DC-to-DC converter 32 is selected to power USB transceiver 40 and USB port 42 even if laptop computer 2 is turned off.

In the example of FIG. 2, laptop computer 2 is an unplugged battery-powered device that includes internal battery 10. If laptop computer 2 is turned on, then laptop computer 2 consumes a significant amount of battery power because CPU 22 is executing instructions and typically demands a current of at least ten amperes even if CPU 22 is idle and in a low-power stand-by state. In the present example, however, laptop computer 2 is turned off and consumes much less battery power because both CPU DC-to-DC converter 16 and main DC-to-DC converter 18 are disabled. In one novel aspect, inrush current detect circuit 34 receives power from battery 10 and is always powered and operational even if laptop computer 2 is turned off. When handheld equipment 3 is connected to USB port 42, inrush current detect circuit 34 detects an inrush current that flows out of USB port 42. In response, inrush current detect circuit 34 enables USB DC-to-DC converter 32 such that USB DC-to-DC converter 32 provides DC voltage VOUT onto the power terminal of USB port 42. Later on, USB DC-to-DC converter 32 is optionally disabled when it detects that handheld equipment 3 is either fully charged or is disconnected from USB port 42. By detecting an inrush current when handheld equipment 3 is connected to USB port 42, handheld equipment 3 is automatically charged through USB port 42 even if laptop computer 2 is turned off and CPU 22 is not consuming power. Therefore, the method of detecting and charging handheld equipment 3 while laptop computer 2 remains unpowered significantly reduces the amount of energy required from laptop computer 2.

Figure 3:
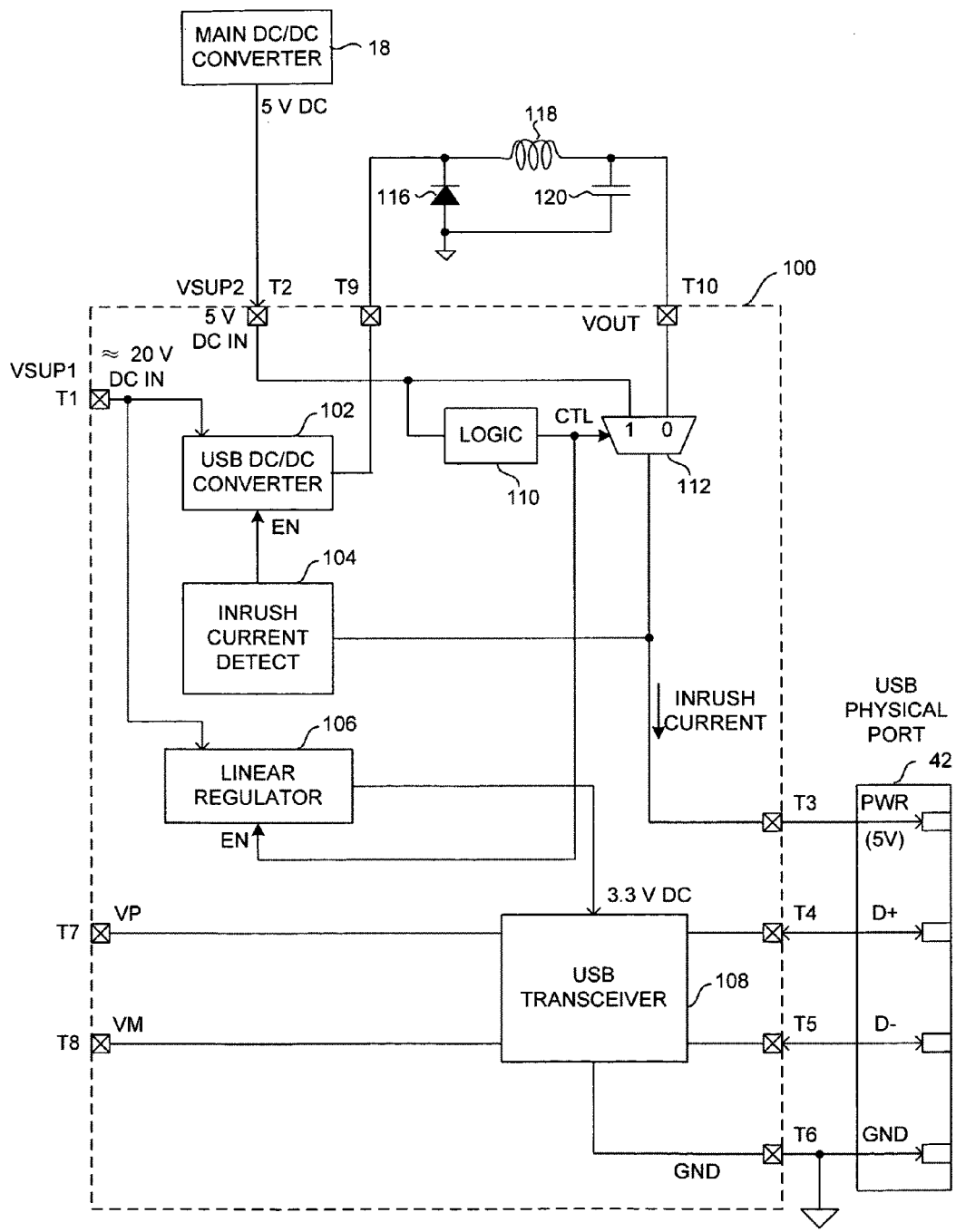
FIG. 3 is a block diagram of an integrated circuit 100 in accordance with one novel aspect.

FIG. 3 is a block diagram of an integrated circuit 100 in accordance with one novel aspect. In one example, integrated circuit 100 is used in laptop computer 2 of FIG. 2 in place of integrated circuit 30. Integrated circuit 100 includes a USB DC-to-DC converter 102, an inrush current detect circuit 104, a linear regulator 106, a USB transceiver 108, logic 110, a selection circuit (for instance, a multiplexer) 112, and terminals T1 to T10. Terminal T1 receives a DC voltage VSUP1 of approximately twenty volts. Terminal T2 receives a DC voltage VSUP2 of approximately five volts. Terminals T3 to T6 are four terminals connecting to a physical USB port 42. Terminal T3 is coupled to power terminal PWR of USB port 42, terminals T4 and T5 are coupled to data terminals D+ and D− of USB port 42, and terminal T6 is coupled to ground terminal GND. Terminals T7 and T8 are coupled to receiver inputs/driver outputs of USB transceiver 108. As illustrated in FIG. 3, there are several discrete components such as a diode 116, an inductor 118, and a capacitor 120. In order to reduce the die area of integrated circuit 100, these discrete components are not integrated within integrated circuit 100. USB DC-to-DC converter 102 and the discrete components together form a buck regulator that converts a DC voltage VSUP1 of approximately twenty volts to a lower regulated DC voltage VOUT of five volts onto terminals T10 and T3. Similar to the example of FIG. 2, when a handheld device is connected to USB port 42, inrush current detect circuit 104 detects an inrush current that flows out of terminal T3 and in response enables USB DC-to-DC converter 102 such that USB DC-to-DC converter 102 provides DC voltage VOUT onto terminal T3 to power USB port 42. In the example of FIG. 3, however, USB transceiver 108 is not powered by USB DC-to-DC converter 102.

Figure 4:
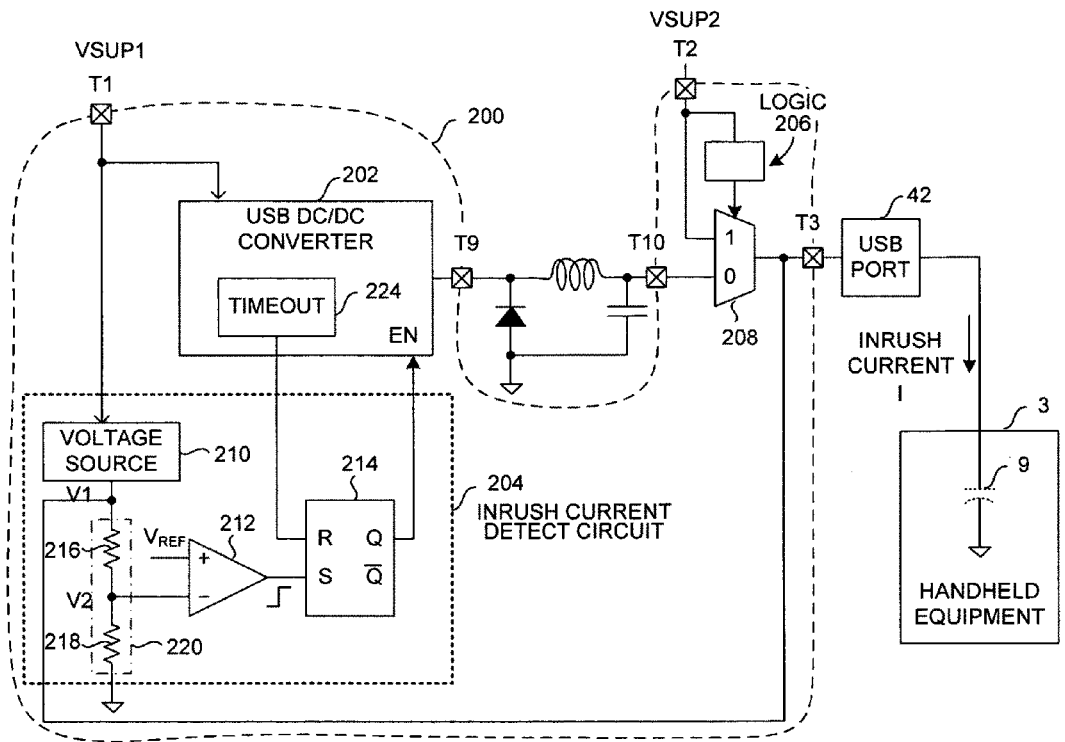
FIG. 4 illustrates a first embodiment of an inrush current detect circuit.

FIG. 4 is a block diagram of an integrated circuit 200 that illustrates a first embodiment of integrated circuit 100 of FIG. 3. Integrated circuit 200 includes a USB DC-to-DC converter 202, an inrush current detect circuit 204, logic 206, and a selection circuit (for instance, a multiplexer) 208. Inrush current detect circuit 204 includes a weak voltage source 210, a comparator 212, a control logic circuit (for instance, a sequential logic element such as an SR latch) 214, and a resistor divider network 220 formed by resistors 216 and 218. Voltage source 210 is coupled to terminal T3 and outputs a DC voltage V1. Resistor divider network 220 is also coupled to the output of voltage source. The center tap of resistor divider network 220 has a voltage V2. An inverting input lead of comparator 212 is coupled to the center tap of resistor divider network 220. A non-inverting input lead of comparator 212 is coupled to a voltage reference VREF. Resistors 216 and 218 are selected such that voltage V2 is slightly higher than voltage VREF. A set input lead of SR latch 214 is coupled to an output of comparator 212. A reset input lead of SR latch 214 is coupled to an output of USB DC-to-DC convert 202. An output lead of SR latch 214 is coupled to an enable input lead of USB DC-to-DC converter 202.

Inrush current detect circuit 204 is powered and operational as long as battery 10 outputs an adequate voltage VSUP1, even if laptop computer 2 is turned off. Inrush current detect circuit 204 consumes very low power. When no external equipment is connected to USB port 42, because voltage V2 is higher than reference voltage VREF, comparator 212 outputs a digital value (for instance, a value of zero) to the set input lead of SR latch 214. SR latch 214 then outputs a digital value (for instance, a value of zero) such that USB DC-to-DC converter 202 remains disabled. When handheld equipment 3 is connected to USB port 42, handheld equipment 3 draws an inrush current I out of terminal T3 of integrated circuit 200. As a result, voltage V2 becomes lower than voltage VREF. Therefore, voltage V2 at the inverting input lead of comparator 212 becomes lower than reference voltage VREF at the non-inverting input lead of comparator 212. Comparator 212 thus supplies a digital value (for instance, a value of one) onto the set input lead of SR latch 214. SR latch 214 then outputs a digital value (for instance, a value of one) to enable USB DC-to-DC converter 202.

As illustrated in FIG. 4, USB DC-to-DC converter 202 includes a timeout circuit 224. In one example, handheld equipment 3 is disconnected from USB port 42 after being charged for a certain period of time. No current flows out of terminal T3 after handheld equipment 3 is disconnected from USB port 42. Once USB DC-to-DC converter 202 detects that no current flows out of terminal T3, timeout circuit 224 starts to count down in time. After a predetermined period of time (for example, five seconds) has elapsed, timeout circuit 224 sends out a digital value (for instance, a value of zero) to the reset input lead of SR latch 214. SR latch 214 is reset and SR latch 214 outputs a digital value (for instance, a value of zero) to disable USB DC-to-DC converter 202.

In another example, handheld equipment 3 remains connected to USB port 42 after being fully charged. Because handheld equipment 3 is fully charged, the current I flows out of terminal T3 is approximately zero. Once USB DC-to-DC converter 202 detects that the current I flows out of terminal T3 is approximately zero, timeout circuit 224 starts to count down in time. Similar to the previous example, after a predetermined period of time (for example, five seconds) has elapsed, timeout circuit 224 sends out a digital value (for instance, a value of zero) to reset SR latch 214. SR latch 214 then outputs a digital value (for instance, a value of zero) to disable USB DC-to-DC converter 202. Therefore, USB DC-to-DC converter 202 is automatically enabled when handheld equipment 3 is connected to USB port 42, and is automatically disabled when handheld equipment 3 is disconnected from USB port 42 or has been fully charged for more than five seconds.

Figure 5:
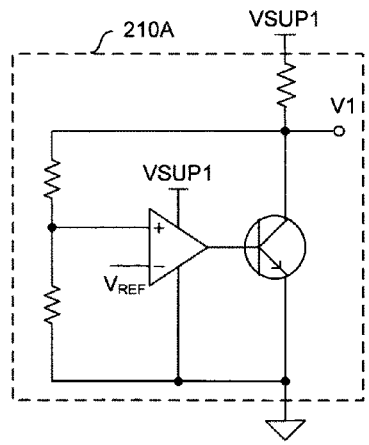
FIG. 5 illustrates a first example of a weak voltage source that is used in an inrush current detect circuit of FIG. 4.

FIG. 5 illustrates a first example of a weak voltage source 210A that is used in an inrush current detect circuit 204 of FIG. 4. Voltage source 210A is a simple shunt voltage regulator.

Figure 6:
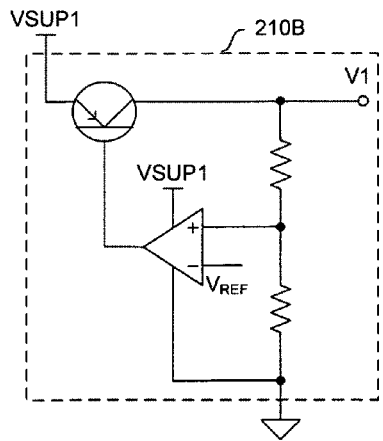
FIG. 6 illustrates a second example of a weak voltage source that is used in an inrush current detect circuit of FIG. 4.

FIG. 6 illustrates a second example of a weak voltage source 210B that is used in inrush current detect circuit 204 of FIG. 4. Voltage source 210B is a simple series voltage regulator.

Both voltage sources 210A and 210B are weak voltage sources that have very low power consumption (for instance, only a few microamps of current). As a result, inrush current detect circuit 204 is operational yet consumes very little power. Therefore, this novel method provides an always available USB port 42 of laptop computer 2 without the need to power on laptop computer 2. In addition, this novel method utilizes internal battery 10 of laptop computer 2 efficiently when no external AC power is available because USB DC-to-DC converter 202 is only enabled when handheld equipment 3 needs to be charged through USB port 42.

Figure 7:
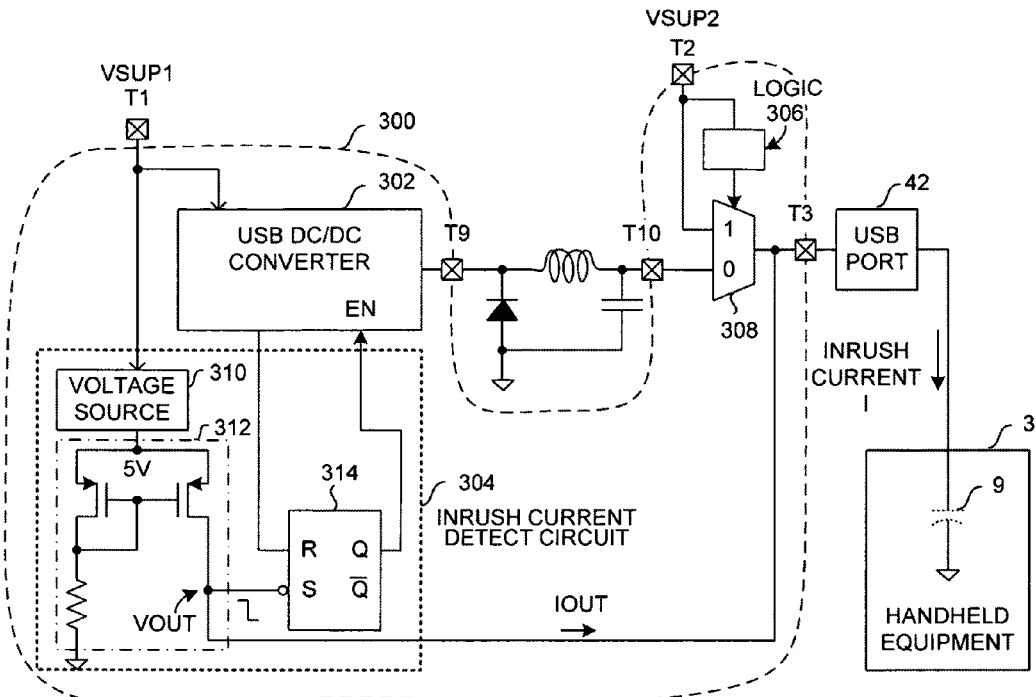
FIG. 7 illustrates another embodiment of an inrush current detect circuit.

FIG. 7 is a block diagram of an integrated circuit 300 that illustrates another embodiment of integrated circuit 100 of FIG. 3. Integrated circuit 300 includes a USB DC-to-DC converter 302, an inrush current detect circuit 304, logic 306, and a multiplexer 308. Inrush current detect circuit 304 includes a voltage source 310, a small current source 312, and a control logic circuit (for instance, an SR latch) 314. Voltage source 310 provides a five volts DC supply voltage to small current source 312. In the example of FIG. 7, small current source 312 is a current mirror and supplies a current IOUT that flows out of terminal T3. An output of current source 312 is coupled to terminal T3. The output voltage VOUT of current source 312 is inverted and then coupled to the set input lead of SR latch 314. An output lead of SR latch 314 is coupled to an enable input lead of USB DC-to-DC converter 302.

Figure 8:
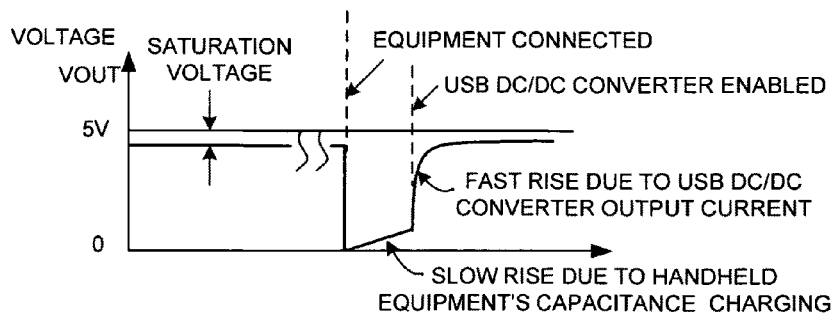
FIG. 8 is a waveform diagram that illustrates how a voltage changes when a handheld equipment is connected to a USB port.

FIG. 8 is a waveform diagram that illustrates how a voltage VOUT on terminal T3 changes when handheld equipment 3 is connected to USB port 42 of FIG. 7.

Figure 9:
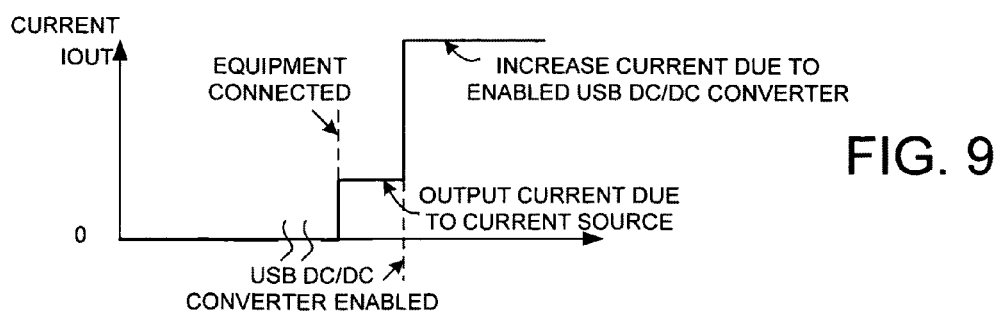
FIG. 9 is a waveform diagram of a current that illustrates how a current changes when a handheld equipment is connected to a USB port.

FIG. 9 is a waveform diagram of illustrates current IOUT that flows out of terminal T3 when handheld equipment 3 is connected to USB port 42 of FIG. 7. As illustrated in FIG. 8 and FIG. 9, before any external equipment is connected to USB port 42, small current source 312 pulls up voltage VOUT on terminal T3 such that voltage VOUT eventually reaches a saturation voltage that is close to the supply voltage of five volts. Voltage VOUT is then inverted to a control signal of digital zero and sent to the set input lead of SR latch 314. SR latch 314 then outputs a digital value of zero such that USB DC-to-DC converter 302 remains disabled. Later on, when handheld equipment 3 is connected to USB port 42, discharged capacitor 9 of handheld equipment 3 pulls voltage VOUT on terminal T3 to ground. Voltage VOUT of zero is then inverted to a control signal of digital one and sent to the set input lead of SR latch 314. SR latch 314 then outputs a digital value of one to enable USB DC-to-DC converter 302.

After handheld equipment 3 is connected to USB port 42 and USB DC-to-DC converter 302 is enabled by inrush current detect circuit 304, handheld equipment 3 starts charging. Typically, handheld equipment 3 is fully charged after one to two hours. In one example, once USB DC-to-DC converter 302 detects that current IOUT is very small, it outputs a digital zero to reset SR latch 314. SR latch 314 then outputs a digital zero to disable USB DC-to-DC converter 302.

Figure 10:
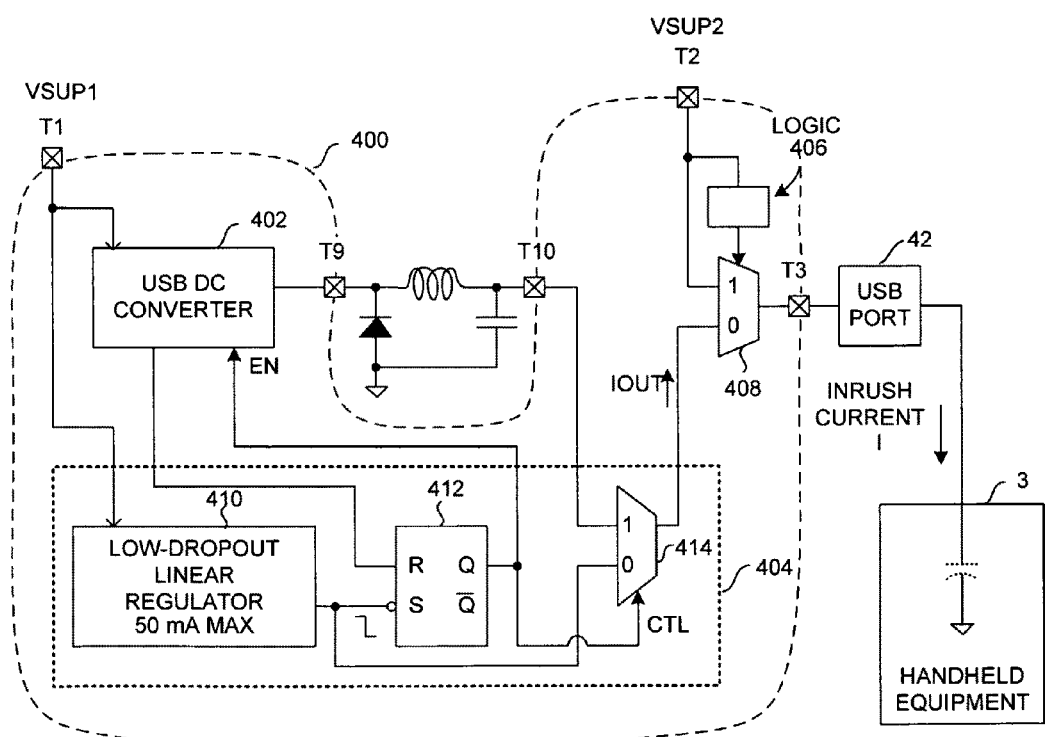
FIG. 10 illustrates a third embodiment of an inrush current detect circuit.

FIG. 10 is a block diagram of an integrated circuit 400 that illustrates a third embodiment of integrated circuit 100 of FIG. 3. Integrated circuit 400 includes a USB DC-to-DC converter 402, an inrush current detect circuit 404, logic 406, and a multiplexer 408. Inrush current detect circuit 404 includes a voltage regulator (for instance, a low-dropout (LDO) linear regulator as illustrated in FIG. 10) 410, an SR latch 412, and a selection circuit (for instance, a multiplexer) 414. An output of LDO linear regulator 410 is inverted and coupled to a set input lead of SR latch 412. The output of LDO linear regulator 410 is also coupled to an input lead of multiplexer 414. An Output lead of SR latch 412 is coupled to an enable input lead of USB DC-to-DC converter 402. The output lead of SR latch 412 is also coupled to a selection lead of multiplexer 414. An output of USB DC-to-DC converter 402 is coupled to another input lead of multiplexer 414.

LDO linear regulator 410 has a low standby current of about a few microamps. LDO linear regulator 410 therefore consumes very low power even when it is powered and operational. In one example, LDO linear regulator 410 is capable of sourcing a maximum of 50 milliamps current. When there is no external equipment connected to USB port 42, LDO linear regulator 410 supplies a five volts DC voltage onto terminal T3. The output of LDO linear regulator is inverted to a digital zero and sent to the set input lead of SR latch 412. As a result, SR latch 412 outputs a digital zero such that USB DC-to-DC converter 402 remains disabled. In addition, the output of SR latch 412 is sent as a control signal CTL of digital zero to multiplexer 414 such that DC voltage provided by LDO linear regulator 410 is selected to supply voltage onto USB port 42.

When handheld equipment 3 is connected to USB port 42, handheld equipment 3 draws an inrush current I (for instance, 300 milliamps) out of terminal T3. LDO linear regulator 410 thus reaches its current limit and outputs a low voltage which is then inverted to a digital one to the set input lead of SR latch 412. As a result, SR latch 412 outputs a digital value of one such that USB DC-to-DC converter 402 is enabled. In addition, the output of SR latch 412 is sent as a control signal CTL of digital one to multiplexer 414 such that DC voltage provided by USB DC-to-DC converter 402 is selected to supply voltage to USB port 42. In one example, when handheld equipment 3 is fully charged, current IOUT that flows out of terminal T3 is dropped to almost zero. Once USB DC-to-DC converter 402 detects that current IOUT is very small, it outputs a reset signal (for instance, a digital zero) to reset SR latch 412. SR latch 412 then outputs a digital value of zero to disable USB DC-to-DC converter 402.

Figure 11:
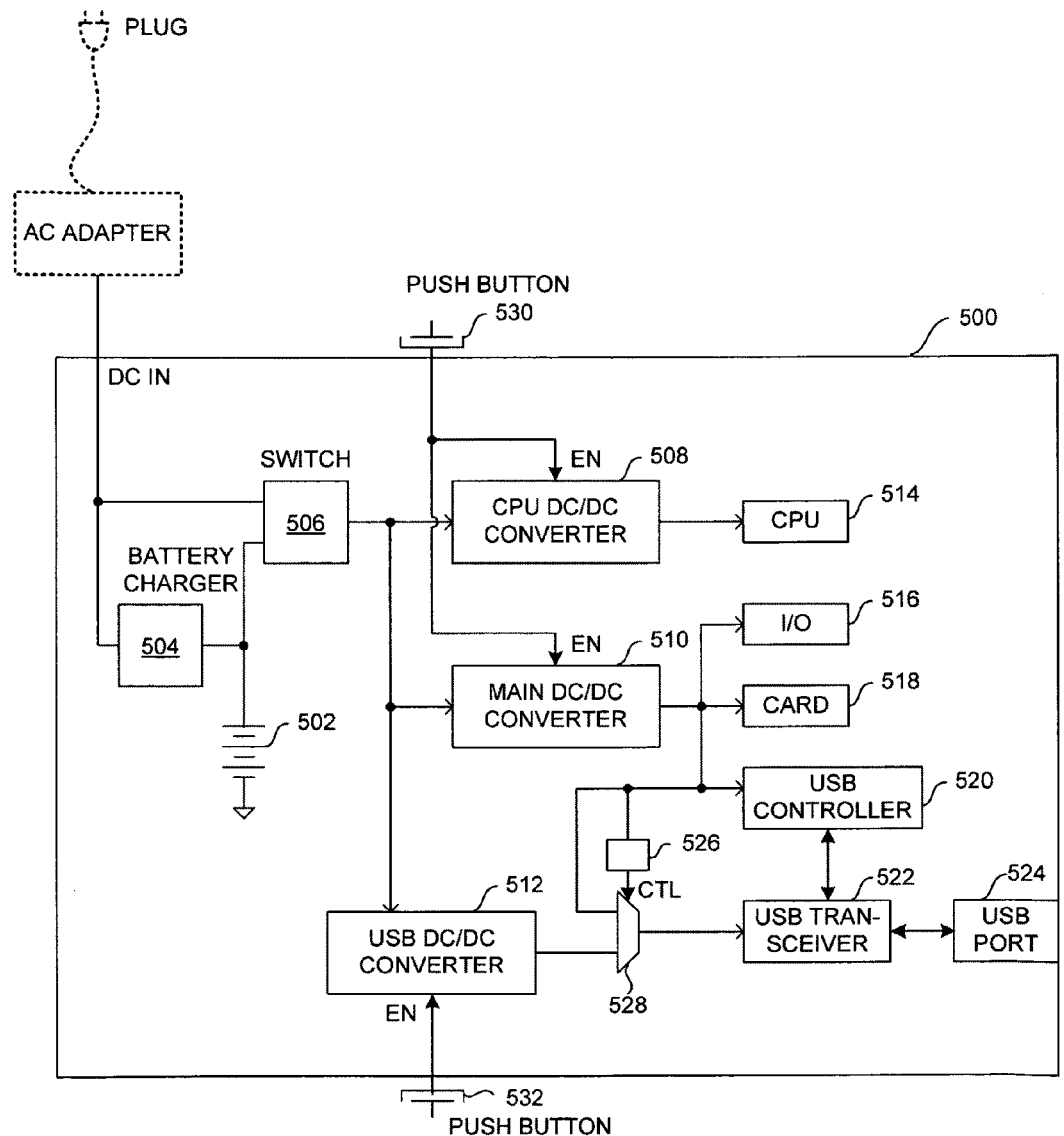
FIG. 11 is a simplified block diagram of a battery-powered device 500 with a second manual switch.

FIG. 11 is a simplified block diagram of an unplugged battery-powered device 500 with a second manual switch. Unplugged battery-powered device 500 includes a battery 502, a battery charger 504, a switch 506, a CPU DC-to-DC converter 508, a main DC-to-DC converter 510, a USB DC-to-DC converter 512, a CPU 514, input and/or output (I/O) 516, CARD (for instance, a network interface card) 518, a USB controller 520, a USB transceiver 522, and a physical USB port 524. CPU 514 is powered by CPU DC-to-DC converter 508. I/O 516, CARD 518, and USB controller 520 are powered by main DC-to-DC converter 510. USB transceiver 522 and USB port 524 are powered either by main DC-to-DC converter 510 or by USB DC-to-DC converter 512.

In one novel aspect, unplugged battery-powered device 500 includes two manual switches. In the example of FIG. 11, a first push button 530 is used to turn on/off the entire unplugged battery-powered device 500 by enabling/disabling CPU DC-to-DC converter 508 and main DC-to-DC converter 510. When unplugged battery-powered device 500 is turned on, it consumes a substantial amount of power from internal battery 502. When unplugged battery-powered device 500 is turned off, a second push button 532 is then used to enable/disable USB DC-to-DC converter 512. For example, when a user wants to charge a handheld device through USB port 524, the user connects the handheld device to USB port 524 and pushes push button 532. USB DC-to-DC converter 512 is then enabled to charge the handheld device through USB port 524. After the handheld device is fully charged or disconnected from USB port 524, USB DC-to-DC converter 512 can be automatically disabled. By introducing an extra push button 532, unplugged battery-powered device 500 has a USB port 524 that is always available even if unplugged battery-powered device 500 is not turned on.

Figure 12:
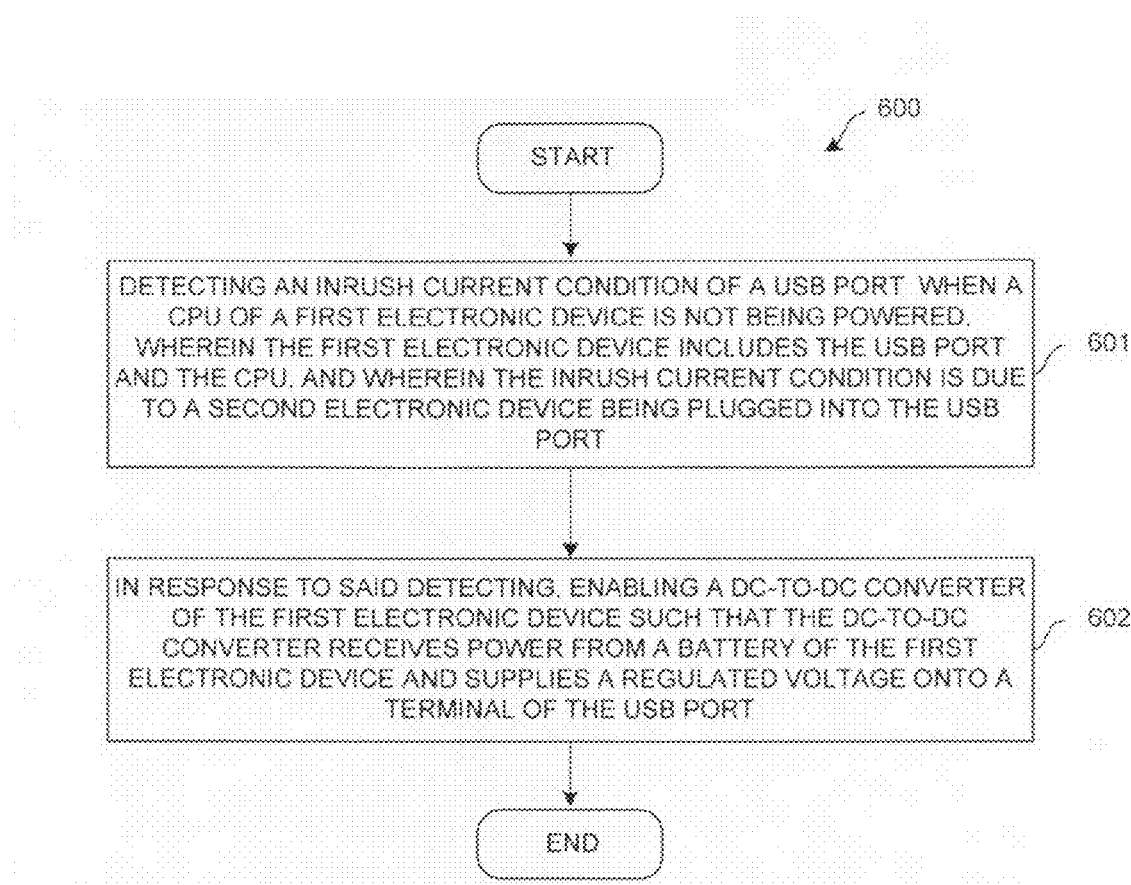
FIG. 12 is a flowchart of a method 600 in accordance with one novel aspect.

FIG. 12 is a flowchart of a method 600 in accordance with one novel aspect. An inrush current condition of a terminal of a USB port of a first electronic device is detected (step 601) when a central processing unit (CPU) of the first electronic device is not being powered. The inrush current is due to a second electronic device being plugged into the USB port. In one example, in response to the detecting, a DC-to-DC converter of the first electronic device is enabled (step 601) such that the DC-to-DC converter supplies a regulated voltage onto the terminal.

Figure 13:
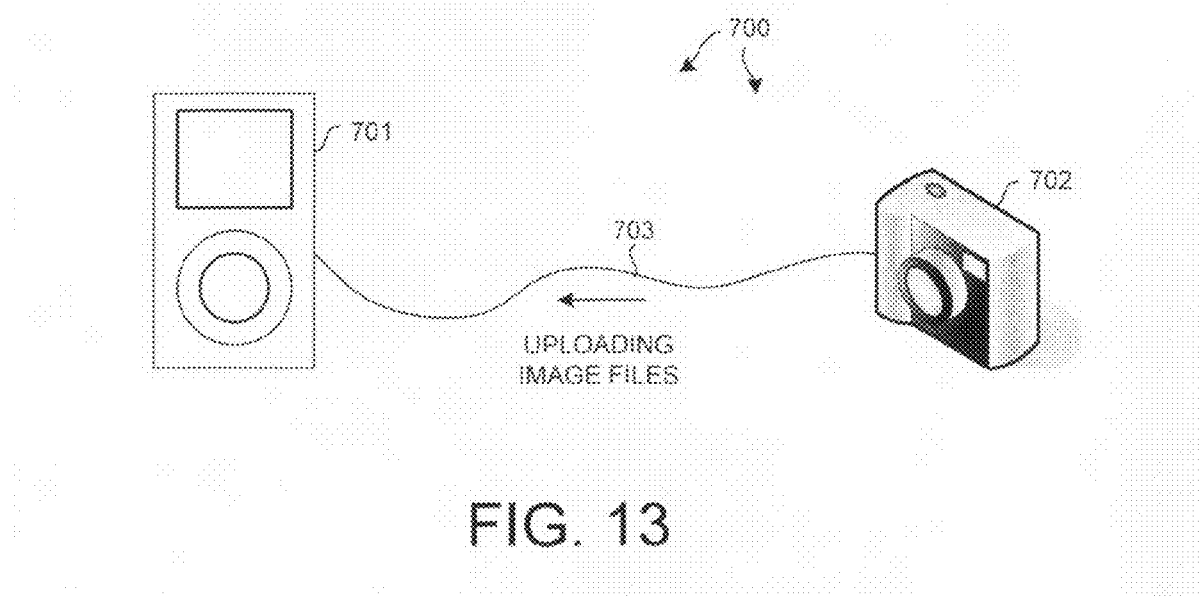
FIG. 13 is a very simplified high level diagram of a system 700 in accordance with one novel aspect.

FIG. 13 is a very simplified high level diagram of a system 700 in accordance with one novel aspect. System 700 includes a portable audio/video player 701, a digital camera 702, and a USB cable 703. Portable audio/video player 701 includes an inrush current detect circuit as described above. In the example of FIG. 13, portable audio/video player 701 is turned-off. When digital camera 702 is connected to portable audio/video player 701 through USB cable 703, the inrush current detect circuit detects digital camera 702 and then automatically enables portable audio/video player 701 such that portable audio/video player 701 starts to initiate uploading image files from digital camera 702 through USB cable 703. In this particular example, portable audio/video player 701 and digital camera 702 communicate with each other using protocols such as Session Request Protocol (SRP) and Host Negotiation Protocol (HNP) specified by USB-On-the-Go (USB-OTG) standard. Therefore, the method of detecting digital camera 702 while portable audio/video player 701 is turned off can also be used in USB-OTG applications.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A method comprising:
   (a) detecting an inrush current condition of a USB port when a central processing unit (CPU) of a first electronic device is not being powered, wherein the first electronic device includes the USB port and the CPU, and wherein the inrush current condition is due to a second electronic device being plugged into the USB port.

2. The method of claim 1, wherein the inrush current condition is detected in (a) by supplying a regulated voltage onto a terminal of the USB port and determining whether a current flowing out of the USB port is larger than a predetermined current.

3. The method of claim 2, wherein the regulated voltage is supplied by a voltage regulator having a limited current capacity.

4. The method of claim 1, wherein the inrush current condition is detected in (a) by applying a current source onto a terminal of the USB port and determining whether a voltage on the terminal of the USB port is lower than a predetermined voltage.

5. The method of claim 1, wherein the first electronic device is a battery-powered device having a battery, and wherein the CPU of the battery-powered device remains unpowered.

6. The method of claim 5, further comprising:
(b) in response to said detecting, enabling a DC-to-DC converter of the first electronic device such that the DC-to-DC converter receives power from the battery and supplies a regulated voltage onto a terminal of the USB port, wherein the regulated voltage is supplied onto the terminal when the CPU of the first electronic device remains unpowered.

7. The method of claim 1, further comprising:
(b) in response to said detecting, transferring information between the first electronic device and the second electronic device through the USB port.

8. The method of claim 1, wherein the first electronic device is not plugged into any external AC power.

9. The method of claim 1, further comprising:
(b) supplying a voltage onto a terminal of the USB port while the CPU of the first electronic device is not being powered and before the second electronic device is plugged into the USB port.

10. A device comprising:
a central processor unit (CPU);
a USB port; and
means for detecting an inrush current condition when the CPU is not being powered, wherein the inrush current condition is due to a second electronic device being plugged into the USB port.

11. The device of claim 10, wherein the means is also for supplying a regulated voltage onto a terminal of the USB port, and wherein the means comprises a DC-to-DC converter that is enabled when the means detects the inrush current condition.

12. A method comprising:
(a) detecting an inrush current flowing out of a USB port when a central processing unit (CPU) of a battery-powered device is not being powered, wherein the battery-powered device includes the USB port, the CPU, a battery, and a DC-to-DC converter; and
(b) in response to said detecting, enabling the DC-to-DC converter so that the DC-to-DC converter receives power from the battery and supplies a regulated voltage onto a terminal of the USB port, wherein the regulated voltage is supplied onto the terminal when the CPU is not being powered by the battery.

13. The method of claim 12, wherein the inrush current is due to an electronic device being plugged into the USB port.

14. The method of claim 12, wherein the inrush current is detected in (a) by determining whether a current flowing out of the USB port is larger than a predetermined current.

15. The method of claim 12, wherein the inrush current is detected in (a) by determining whether a voltage on the terminal is lower than a predetermined voltage.

16. The method of claim 12, further comprising:
(c) detecting that a current flowing out of the USB port is less than a predetermined current; and
(d) in response to the detecting of (c), disabling the DC-to-DC converter.

17. The method of claim 12, wherein the DC-to-DC converter is not coupled to supply power to the CPU.

18. A device comprising:
a central processing unit (CPU) that is unpowered;
a battery;
a USB port;
a DC-to-DC converter; and
an inrush current detect circuit, wherein upon a detection of an inrush current flowing out of the USB port, the inrush current detect circuit enables the DC-to-DC converter such that the DC-to-DC converter receives power from the battery and supplies a regulated DC voltage onto a terminal of the USB port, and wherein the regulated DC voltage is supplied onto the terminal while the CPU remains unpowered.

19. The device of claim 18, wherein the inrush current is due to an electronic device being plugged into the USB port.

20. The device of claim 18, wherein the DC-to-DC converter is disabled when a current flowing out of the USB port is less than a predetermined current.

21. The device of claim 18, wherein the inrush current detect circuit comprises:
a voltage source that is coupled to the terminal of the USB port;
a comparator that compares a voltage on the voltage source and a reference voltage, wherein the comparator outputs a digital value; and
a control logic circuit that receives the digital value and in response enables the DC-to-DC converter.

22. The device of claim 18, wherein the inrush current detect circuit comprises:
a current source having an output node coupled to the terminal of the USB port, wherein the current source outputs a control signal; and
a control logic circuit that receives the control signal and in response enables the DC-to-DC converter.

23. The device of claim 18, wherein the inrush current detect circuit comprises:
a voltage regulator that outputs a voltage; and
a selection circuit that is controlled by the voltage regulator and that couples a selectable one of either the voltage provided by the voltage regulator or a voltage provided by the DC-to-DC converter onto the terminal of the USB port.

24. An integrated circuit comprising:
a first terminal that receives a first supply voltage;
a second terminal that receives a second supply voltage;
a DC-to-DC converter that is operable in an enabled mode and a disabled mode, wherein the DC-to-DC converter is powered by the first supply voltage and generates a third voltage in the enabled mode;
a selection circuit that is controllable by the second supply voltage and that couples a selectable one of either the second supply voltage or the third voltage onto a third terminal; and
an inrush current detect circuit powered by the first supply voltage, wherein the inrush current detect circuit detects an inrush current flowing out of the third terminal and enables the DC-to-DC converter to operate in the enabled mode, wherein a host device includes a central processing unit (CPU) and a USB port, wherein the third terminal is on the USB port, and wherein the CPU is not being powered when an electronic device is being plugged into the USB port of the host device.

25. The integrated circuit of claim 24, wherein the third terminal is a power terminal of the USB port, and wherein the inrush current is due to an electronic device being plugged into the USB port.

26. The integrated circuit of claim 24, further comprising:
a USB transceiver that is powered by the second supply voltage through a voltage regulator.

* * * * *